Nov. 4, 1969     C. MATTLY     3,476,032
SUN PROTECTION DEVICE FOR VEHICLES
Filed March 13, 1967
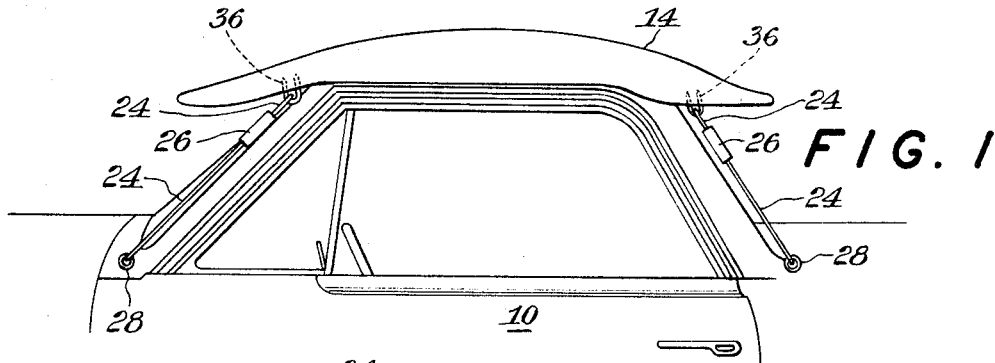
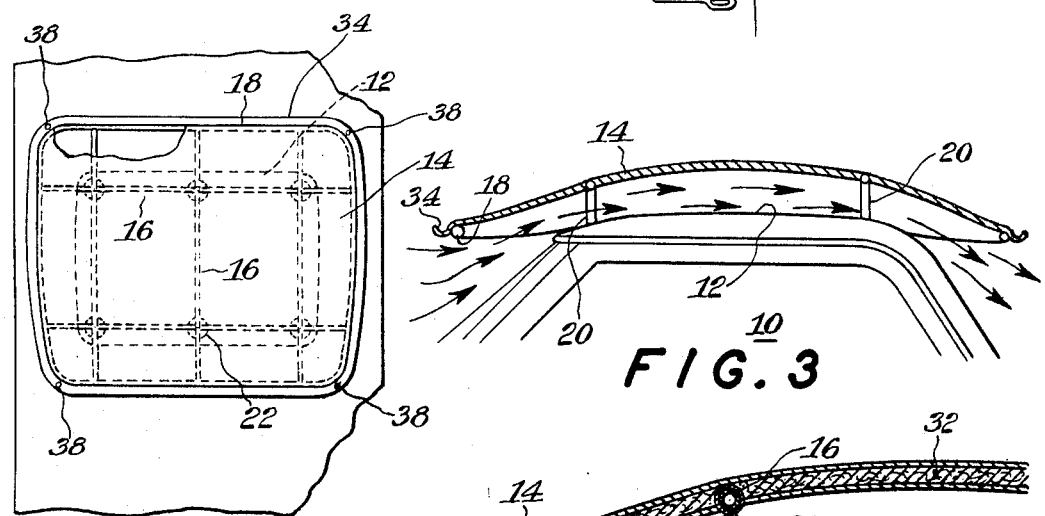
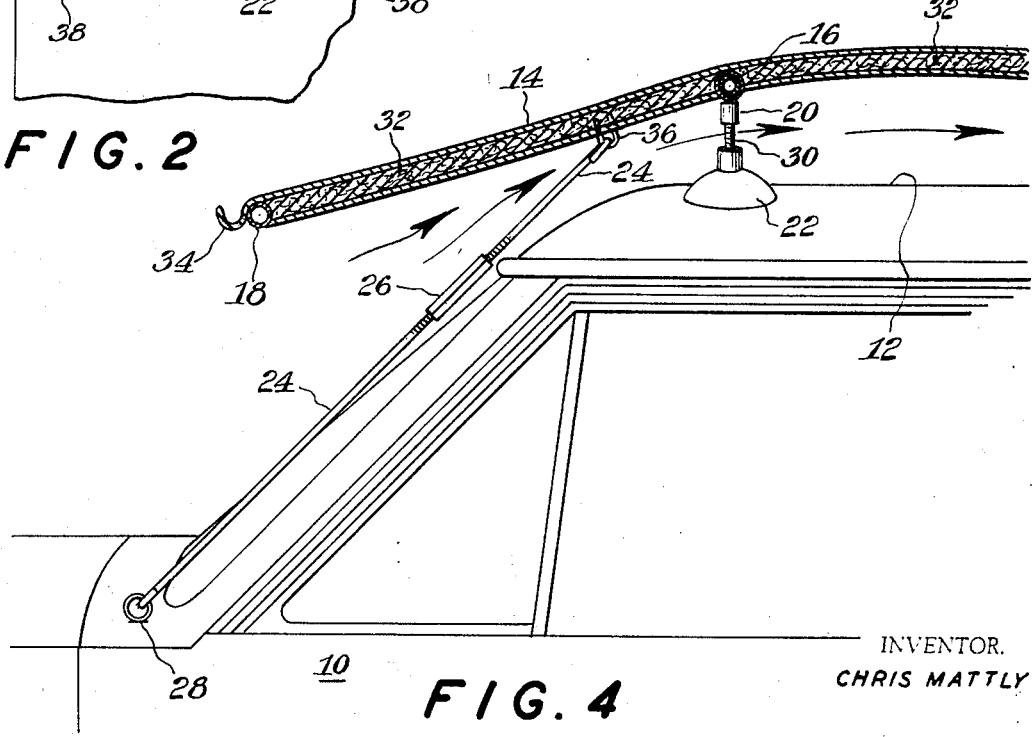
INVENTOR.
CHRIS MATTLY

United States Patent Office 3,476,032
Patented Nov. 4, 1969

3,476,032
SUN PROTECTION DEVICE FOR VEHICLES
Chris Mattly, 2505 Alturas Drive,
Bakersfield, Calif. 93305
Filed Mar. 13, 1967, Ser. No. 622,807
Int. Cl. B60h 1/24; B60j 1/20
U.S. Cl. 98—2      3 Claims

ABSTRACT OF THE DISCLOSURE

My dish-shaped device sits on four rods and suction cups which sit on the corners of the cab with 2″ space between top and shield letting the air flow freely in any direction when stationary or at high speed; cutting down the sun impact and making it cooler in the vehicle.

---

My invention is directed toward vehicles such as automobiles or trucks and more particularly is directed toward devices for shielding the vehicles from the sun.

Accordingly, it is an object of my invention to provide a new and improved device for minimizing the build up of heat within the interior of a roofed portion of a vehicle otherwise produced by the heat load of the sun upon the roof.

Another object is to provide a new and improved device of the character indicated that can be easily manufactured at low cost and can be readily and easily secured to or detached from the roof of a vehicle.

Still another object is to provide a new and improved device of the character indicated that keeps the windows free of rain spatters making driving safer especially at night with light glare.

All of the foregoing and still further objects and advantages of my invention will now be explained with reference both to this specification and to the accompanying drawings wherein:

FIG. 1 is a side view of my invention in use;
FIG. 2 is a top view thereof;
FIG. 3 is a cross sectional side view thereof; and
FIG. 4 is an enlarged cross sectional view thereof illustrating the interior construction of my invention.

Referring now to FIGS. 1-4, there is shown the cab 10 of a truck having a roof 12. My invention includes a hollow inverted dish-shaped member 14 formed for example and filled with fiber glass 32 and containing a plurality of spaced apart horizontal metal bars 16 which extend at right angles to each other to form a grid and which are surrounded by a peripheral metal enclosure 18 having a drip molding 34 secured to its outer edge. A plurality of spaced apart vertical members 20 extend downward from the grid and terminate in screws 30 threadedly engaging the top shanks of suction cups 22 which are detachably secured to the roof. Rods 24 and turnbuckles 26 connect the front and rear peripheral portions of member 14 via suction cups 28 to the hood and trunk portions of the cab whereby the peripheral edge of the body 14 always extends below the level of the roof and yet the bottom surface of the member 14 is spaced apart from the roof. Back and front turnbuckles are secured to back and front loops 36 welded to bars 16. Molding 34 can have drains 38 in each corner.

In use, the top surface of member 14 reflects the sun's rays while, when the cab is in movement a stream of air flows continuously between the member 14 and the roof top to provide additional cooling action.

While I have described my invention with particular reference to the drawings, my protection is to be limited only by the terms of the claims which follow.

Having thus described my invention, I claim as new and desire to secure by Letters Patent:

1. A device for minimizing the build up of heat within the interior of a vehicle having a roof because of heat load of the sun upon the roof, said device comprising (a) a dish-shaped heat shield having a hollow fiber glass body filled with insulating material with a metal rectangular frame therein; (b) and a plurality of spaced apart support adjustable rods with rubbers suction cups extending downwards from said shield to detachably secure said shield to the top surface of said roof in a position at which the peripheral edge of said shield extends below the roof line and yet the inner surface of said shield is always spaced apart from said roof whereby when said vehicle is in movement or stationary an air stream flows in any direction between the shield and roof and said shield reflects sunlight whereby the interior of the vehicle is cooled.

2. The device of claim 1 wherein one end of a plurality of rods is secured to the heat shield by hooks and the other end of the plurality of rods is secured to the vehicle body and each rod includes a turnbuckle for securing purposes.

3. The device of claim 2 wherein a drip molding extends around the peripheral edge of said heat shield.

References Cited
UNITED STATES PATENTS

| | | | |
|---|---|---|---|
| 1,778,591 | 10/1930 | Genett | 98—2.7 |
| 2,361,924 | 11/1944 | Boynton | 98—2.7 |
| 2,523,104 | 9/1950 | Emmert | 98—2.7 |

MEYER PERLIN, Primary Examiner